July 24, 1962 H. D. GAITE 3,045,904

TAPE READERS AND THE LIKE

Filed May 11, 1959 3 Sheets-Sheet 1

INVENTOR

Harold Dodimead Gaite

BY Dennis Manning

ATTORNEY

INVENTOR
Harold Dodimead Gaite
BY [signature]
ATTORNEY

July 24, 1962 H. D. GAITE 3,045,904

TAPE READERS AND THE LIKE

Filed May 11, 1959 3 Sheets-Sheet 3

INVENTOR
Harold Dodsmead Gaite
BY
ATTORNEY 3,045,904
TAPE READERS AND THE LIKE
Harold Dodimead Gaite, Taplow, England, assignor to British Telecommunications Research Limited, Taplow, England
Filed May 11, 1959, Ser. No. 812,321
Claims priority, application Great Britain May 20, 1958
4 Claims. (Cl. 235—61.11)

The present invention relates to tape readers and the like by which is meant equipment for sensing holes in a perforated tape and producing suitable switching operations in accordance with the information represented by the different punchings in the tape. Such equipment is already well known and has been in common use for many years in machine telegraphy.

Perforated tape of the type being considered represents a convenient storage medium and provides storage for a large number of successive items of information in small compass. In certain circumstances it may be advantageous to be able to read more than one row of holes at a time or to read again a particular row of holes after an item of information recorded in a later position has been read. The chief object of the invention is to provide a multiple tape reader which will enable this to be done conveniently and thus avoid the necessity for separate storage equipment which would otherwise be required.

According to the invention therefore, in a tape reader for reading information stored on a punched tape, a plurality of rows of peckers is provided spaced apart the same distance as that between successive rows of holes so as to permit a plurality of characters to be read simultaneously or in non-consecutive order.

In some circumstances, it may be advantageous to read a plurality of rows of holes simultaneously in which case the separation of the necessary signals is preferably effected by suitable electric circuitry while in other cases it suffices to read a single row of holes at a time but the order in which successive readings takes place is different from the order in which the rows appear on the tape. Alternatively, it may be arranged that the tape is brought to rest while rows of holes which have already been read are read again.

With this mechanical construction, it may be unduly complicated to withdraw all the peckers at each step and according to a subsidiary feature of the invention, the tape is moved clear of the peckers immediately prior to its next advancing step and the movement of the peckers themselves is limited to that produced according as a hole is or is not encountered. With this arrangement, the tape may be advanced by pins engaging in the usual feed holes or it may be convenient to advance the tape by gripping it and pulling it forward, the gripping device then being opened and retracted in readiness for the next step. In this latter case, the same driving lever may effect both the movement of the tape platform and the gripping operation while another lever swings the gripping device in the direction of motion. The levers may be operated by cams on a rotating shaft, but as the tape reader will normally be used in conjunction with electronic equipment, it is usually preferable to use electromagnets directly.

Figure 1:
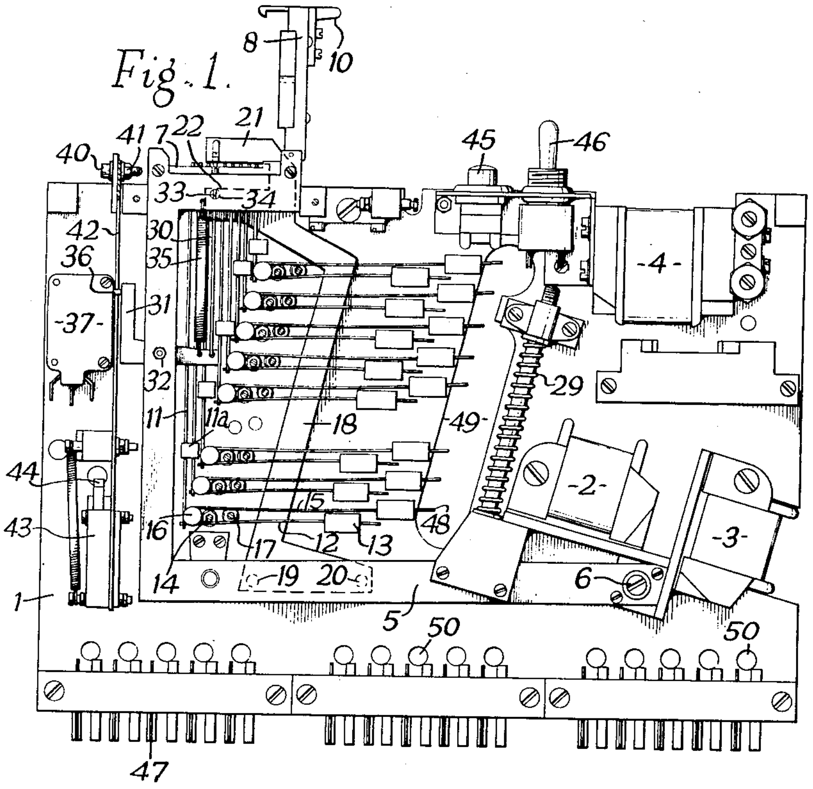
Figure 2:
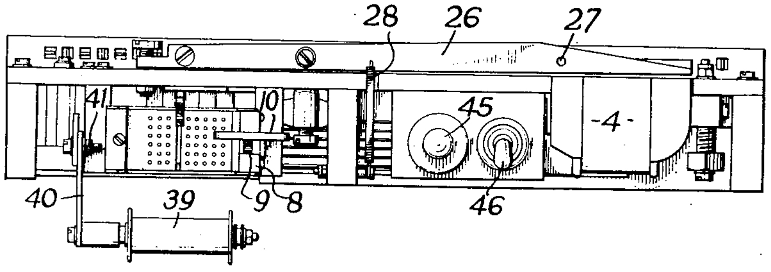
Figure 3:
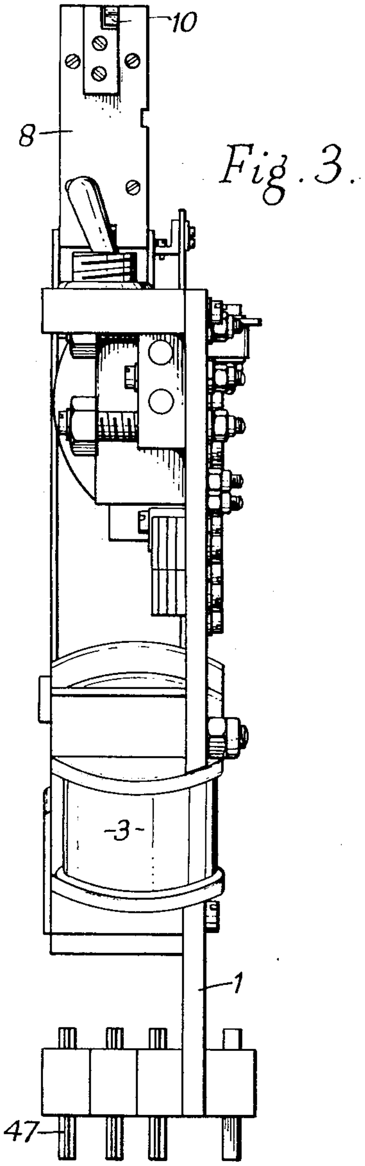
Figure 4:
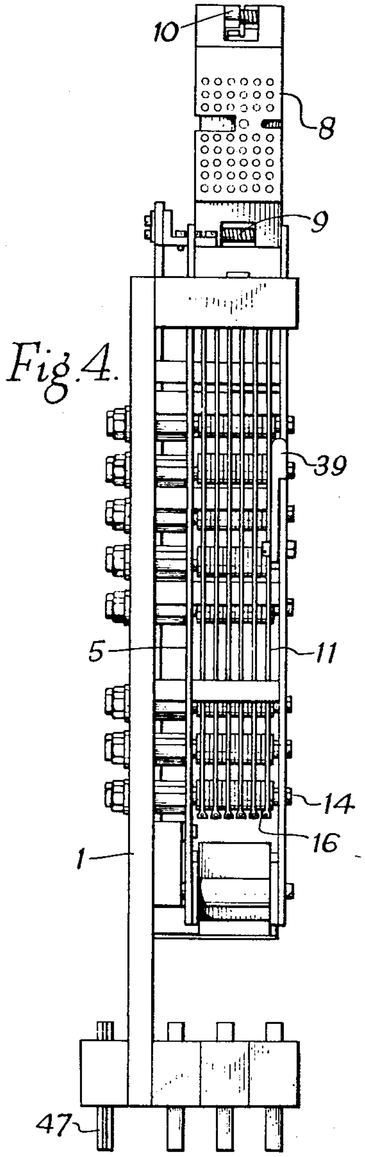
Figure 5:
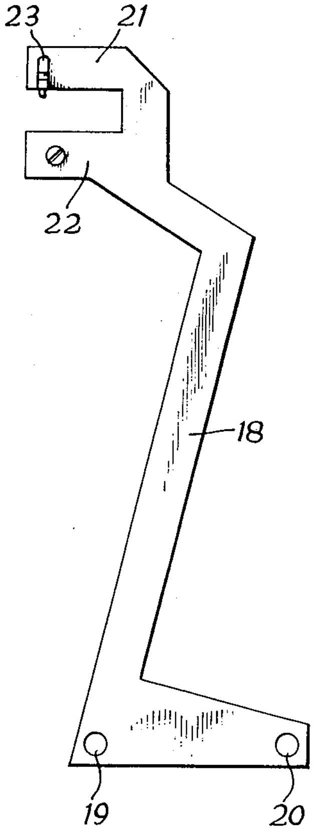
Figure 6:
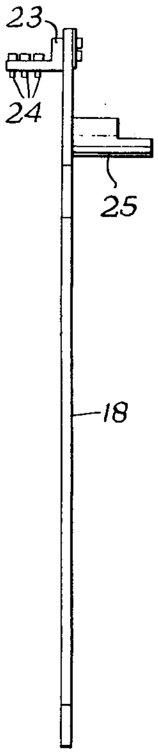
Figure 7:
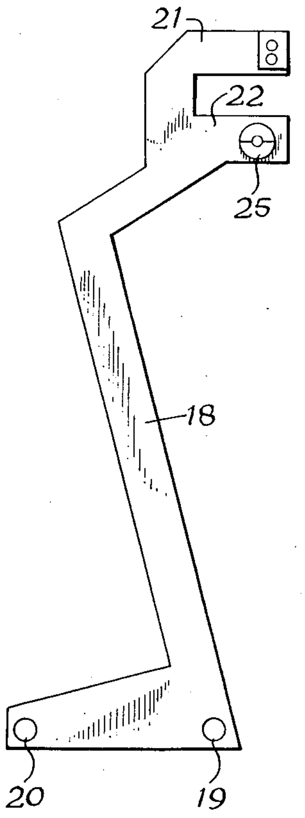

The invention will be better understood from the following description of a preferred embodiment which should be taken in conjunction with the accompanying drawings comprising FIGURES 1–7. Of these, FIG. 1 is a side elevation of the complete multiple reader, FIG. 2 is a plan view, FIG. 3 is an end elevation from the right in FIG. 1, FIG. 4 is an end elevation from the left in FIG. 1, while FIGS. 5, 6 and 7 are three different views of the member for effecting the tape drive. The tape guide roller shown in FIG. 2, which is associated with the tight tape contacts, has been omitted from the other figures in which it would normally be visible in order to avoid obscuring other parts.

Considering now particularly FIG. 1, the various elements of the device are mounted on a flat substantially rectangular metallic base plate 1. The necessary driving operation is effected under the control of the electromagnets 2, 3 and 4 which are identical but are mounted differently in accordance with the function which they have to perform. Magnets 2 and 3 both operate the member 5 for moving the tape platform and a single magnet could have been employed for this funciton but it was found more convenient to make use of existing magnets and employ only one size. The member 5, which consists of two identical side members suitably joined, is pivoted at the point 6 and carries the tape platform 7. It will be seen that in view of the layout, this platform performs a substantially vertical movement as the magnets 2 and 3 are energised and de-energised. The platform 7 is of insulating material and is provided with a pattern of holes as more clearly seen in FIG. 2 to accommodate the various rows of peckers. It is considered that the advantages of the invention will be sufficiently attained if provision is made for six positions to be read simultaneously and accordingly six rows of peckers and corresponding holes in the platform 7 are provided. Eight operative peckers are provided in each tape position in order to allow for the use of tape employing this number of possible holes but in order to permit the use of five- and six-holed tape, adjustable guides may be provided so that the tape is restricted to a position in which certain of the peckers are not used. The member 5 also carries the usual pivoted cover plate 8 which is urged by the spring 9 encircling its pivot into the open position in which it is shown, to permit tape to be inserted. During operation, this cover plate is held closed in the usual manner by the spring catch 10.

As already mentioned, the peckers 11 pass through holes in the platform 7 and are further restrained by insulating guides such as 11*a*. Considering the peckers on the extreme left, of which there will be six extending in a direction perpendicular to the plane of the paper, each of these is associated with a spring such as 12 which passes through or otherwise is secured to the lower end of the pecker and is supported in an insulating block 13. The spring 12 normally urges the pecker upwards except insofar as it is restrained by an unpunched portion of the tape and the spring then engages the bar 14 which is secured to the base plate 1 but insulated therefrom. When the pecker is pressed downwards, the spring 12 is moved clear of the bar 14 and a spring 15 which is separated from the spring 12 by the insulator 16 and is tensioned downwards then engages the bar 17 which is mounted on the base plate in a similar manner to the bar 14. The other peckers are mounted similarly and their associated springs are arranged to engage similar common bars.

The tape drive is effected by means of the member 18 shown separately in FIGS. 5, 6 and 7 which is generally Z-shaped and is loosely pivoted to the base plate 1 at the points 19 and 20 so as to be capable of rocking slightly in a direction perpendicular to the plane of the paper in FIG. 1. The upper end is bifurcated to form two horizontal extensions 21 and 22 and to the upper one 21 is screwed a bracket 23 carrying three pins 24. The lower arm 22 carries a stepped cylindrical projection 25 which co-operates with the stepped end of the armature 26 of the driving magnet 4. This armature is pivoted at 27 and is urged into the position shown in FIG. 2 by the spring 28.

In the operation of the tape reader the energisation of the magnets 2 and 3 results in compression of the spring 29 and the raising of the platform 7 so that the tape is moved clear of the peckers and the driving holes therein engage with the pins 24 at the extremity of the member 18. The magnet 4 is then energised and operates its armature 26 so that the member 18 is rocked upwards in the FIG. 2 view, drawing the tape with it along the platform 7. Magnets 2 and 3 are then de-energised so that the platform 7 is lowered and the peckers are presented to the next row of holes and at the same time the driving holes are disengaged from the pins 24. Magnet 4 is then de-energised so as to return these pins to their original position and the whole cycle is then repeated.

The tape reader is provided with the usual tape sensing and tight tape contacts to arrest the operation if no tape is present or the tape becomes entangled and draws tight. The sensing operation is effected by the special pecker 30 which is attached to one arm of a bell-crank lever 31 which is pivoted on the member 5 at the point 32. This pecker has a small pin 33 extending through it which moves in the hole 34 in the upper part of the member 5 and serves to limit the movement of the pecker which is urged upwards by the spring 35. The other arm of the lever 31 engages the operating button 36 of a micro-switch 37 which is secured to the base plate and produces the usual controls. The tight tape contacts are operated by a guide roller 39, FIG. 2, which is mounted on the arm 40 of a bell-crank lever pivoted at 41. The other arm 42 of this lever extends downwards and carries a micro-switch 43. When the tape draws tight, the roller 39 is moved towards the unit and the lower arm 42 causes the micro-switch 43 to engage the base plate and operate its contacts against the action of the spring 44.

The unit conveniently carries a push button 45 and a switch 46 for controlling the operation of other equipment therefrom and is provided with plug-in contacts 47 to facilitate its mounting. It will be understood that the ends 48 of the springs such as 12 and 15 are wired to some of the plug contacts and this wiring may conveniently extend through the holes 49 and 50 in the base plate.

It will be understood that with the construction described, it is possible to read a plurality of rows of holes simultaneously so that a particular switching operation can be made dependent on a particular combination of a predetermined number of characters and this provides a very considerable number of choices. It may be used, for example, for automatic telegraph switching where the characters represent the initial letters of an exchange name as is common practice in automatic telephony.

The improved multiple tape reader may also be employed in an error correcting circuit where a particular character is transmitted to distant responding equipment and a request for re-transmission may be received if the character arrives mutilated which will be apparent if a self-checking code is employed. Dependent on the propagation time of the circuit, the tape will have advanced one or more steps but the signal originally sent may then be re-transmitted by holding the tape drive and re-reading the sets of peckers in turn. Tape drive may be resumed after the original set of peckers has been re-read. There is thus no need for any separate storage.

The invention accordingly forms a ready means of adding to the facilities which can be obtained from punched tape and thus enables it to be used to better advantage not only in telegraphy but also for the control of equipment, such as computers and automatic machine tools.

I claim:

1. In a tape reader for reading information stored on punched tape, a plurality of sets of substantially parallel sensing members spaced apart in parallel planes a distance equal to the distance moved by the tape between successive sensing operations, means for supporting said sensing members so as to be capable of longitudinal movement, a contact spring associated with each sensing member and operable due to the movement thereof, insulating means for supporting said contact springs, all the contact springs being substantially parallel and substantially at right angles to said sensing members in the plane of the set, contact bars co-operating with said contact springs and extending substantially at right angles to the planes of the sets of sensing members, said contact bars being individual to the respective sensing members of a set but common to all said plurality of sets, and means for advancing the tape so as to present any particular item of information to said sets of sensing members in turn.

2. In a tape reader for reading information stored on a punched tape, a plurality of sets of sensing members, a perforated tape-supporting platform through which said sensing members project, a tape-driving member, a first electromagnet, means operable on the energisation of said first electromagnet for moving said platform clear of said sensing members and bringing about a tape engaging condition of said tape-driving member, a second electromagnet, and means operable on the energisation of said second electromagnet for moving said tape driving member so as to effect the advance of said tape one step.

3. In a tape reader for reading information stored on punched tape, a plurality of sets of sensing members, a driving member extending substantially at right angles to the plane of the tape and pivoted at the end remote from the tape, a row of pins on said driving member each of said pins extending substantially parallel to said driving member and said row extending substantially at right angles to its length so as to be capable of engaging with holes in the tape, means for moving said tape at right angles to its plane to effect engagement between said pins and the holes in said tape, and means for rocking said driving member about its pivot to effect a tape-driving operation.

4. In a tape reader for reading information stored on punched tape, a plurality of sets of sensing members, a perforated tape-supporting platform through which said sensing members project, a driving member extending substantially at right angles to the plane of said platform and pivoted at the end remote therefrom, a row of pins on said driving member each of said pins extending substantially parallel to said driving member and said row extending substantially at right angles thereto so as to be capable of engaging with holes in the tape, means for moving said platform clear of said sensing members and producing a tape-engaging condition of said pins, and means for rocking said driving member about its pivot to effect a tape-driving operation.

References Cited in the file of this patent

UNITED STATES PATENTS

| | | |
|---|---|---|
| 1,780,621 | Lasker | Nov. 4, 1930 |
| 2,107,008 | Lasker | Feb. 1, 1938 |
| 2,193,967 | Kleinschmidt | Mar. 19, 1940 |
| 2,474,257 | Kleinschmidt | June 28, 1949 |
| 2,659,767 | Zenner | Nov. 17, 1953 |
| 2,675,177 | Perrin | Apr. 13, 1954 |
| 2,727,091 | Zenner | Dec. 13, 1955 |
| 2,857,459 | Goetz | Oct. 12, 1958 |